(12) United States Patent
M'Raihi et al.

(10) Patent No.: US 10,432,589 B1
(45) Date of Patent: Oct. 1, 2019

(54) SECURE END-TO-END COMMUNICATIONS (71) Applicant: Symphony Communication Services Holdings LLC, Palo Alto, CA (US)

(72) Inventors: David M'Raihi, San Carlos, CA (US); David Gurle, Palo Alto, CA (US); Michael Harmon, Saratoga, CA (US); Jon McLachlan, San Francisco, CA (US); Ivan Rylach, Mountain View, CA (US); Sergey Stelmakh, Mountain View, CA (US)

(73) Assignee: Symphony Communication Services Holdings LLC, Palo Alto, CA (US)

( * ) Notice: Subject to any disclaimer, the term of this patent is extended or adjusted under 35 U.S.C. 154(b) by 326 days.

(21) Appl. No.: 15/223,557

(22) Filed: Jul. 29, 2016

Related U.S. Application Data (60) Provisional application No. 62/199,798, filed on Jul. 31, 2015, provisional application No. 62/199,803, filed on Jul. 31, 2015.

(51) Int. Cl.
*H04L 9/32* (2006.01)
*H04L 29/06* (2006.01)
*H04L 9/14* (2006.01)
*H04L 9/30* (2006.01)
*H04L 12/58* (2006.01)

(52) U.S. Cl.
CPC ............ *H04L 63/0428* (2013.01); *H04L 9/14* (2013.01); *H04L 9/302* (2013.01); *H04L 9/3249* (2013.01); *H04L 51/04* (2013.01); *H04L 63/065* (2013.01)

(58) Field of Classification Search
None
See application file for complete search history.

(56) References Cited

U.S. PATENT DOCUMENTS

| | | | |
|---|---|---|---|
| 8,266,433 B1 * | 9/2012 | Przykucki | H04L 67/1097 380/286 |
| 9,591,479 B1 * | 3/2017 | Leavy | H04L 9/0833 |
| 9,667,416 B1 * | 5/2017 | Machani | H04L 9/0822 |
| 2005/0223216 A1 * | 10/2005 | Chan | H04L 63/0442 713/153 |

(Continued)

*Primary Examiner* — Lynn D Feild
*Assistant Examiner* — Vadim Savenkov
(74) *Attorney, Agent, or Firm* — Goodwin Procter LLP (57) ABSTRACT

A communication server, interacting with an organization system having users that wish to communicate securely, provides secure communication capability to the users, without the communication server itself having access to unencrypted content of the user communications or to cryptographic keys that would allow the communication server to derive the unencrypted content. Thus, the communication server that provides the secure communication capability need not itself be trusted by the users with access to communicated content. To achieve this, the various entities communicate to exchange cryptographic keys in such a manner that the communication server never obtains usable copies of the cryptographic keys. Secure search capability is also provided by the client devices supplying a set of message tokens obtained by transformations that the communication server cannot replicate, and the communication server maintaining a search index storing the message tokens in association with the (encrypted) messages from which they were obtained.

19 Claims, 6 Drawing Sheets

(56) References Cited

U.S. PATENT DOCUMENTS

| | | | | |
|---|---|---|---|---|
| 2010/0257351 A1* | 10/2010 | O'Connor | ............ | H04L 9/0894 |
| | | | | 713/150 |
| 2012/0173885 A1* | 7/2012 | Acar | .................... | H04L 9/0877 |
| | | | | 713/193 |
| 2012/0254616 A1* | 10/2012 | Brown | .................. | H04L 9/0825 |
| | | | | 713/171 |
| 2013/0013921 A1* | 1/2013 | Bhathena | .............. | H04L 9/0825 |
| | | | | 713/168 |
| 2013/0246791 A1* | 9/2013 | Di Crescenzo | ....... | H04L 63/062 |
| | | | | 713/168 |
| 2014/0281553 A1* | 9/2014 | Illion | ..................... | H04L 51/28 |
| | | | | 713/173 |
| 2015/0089244 A1* | 3/2015 | Roth | ................... | G06F 21/6209 |
| | | | | 713/193 |
| 2016/0294553 A1* | 10/2016 | Hattori | .................. | H04L 9/3226 |
| 2017/0295398 A1* | 10/2017 | Delahaye | ............ | H04N 21/234 |

\* cited by examiner

SECURE END-TO-END COMMUNICATIONS

RELATED APPLICATIONS

This application claims the benefit of Provisional Application Nos. 62/199,798 and 62/199,803, both filed on Jul. 31, 2015 and incorporated herein by reference.

TECHNICAL FIELD

The disclosed embodiments relate generally to computer communications and, more specifically, to providing secure encrypted communications among users of a communications server.

BACKGROUND

Users often communicate with each other over the Internet in an unsecure manner. Unsecure communications are acceptable for many purposes where the information communicated is of a non-sensitive nature.

However, there are many contexts in which the information communicated is actually or potentially sensitive, such as when communicating confidential business details, conducting e-commerce, and the like. In such contexts, the communicating users should employ systems with cryptographic capabilities that can encrypt and decrypt the communicated information. This prevents intermediate parties—such as active eavesdroppers, or systems such as routers that make up the Internet architecture—from being able to obtain the communicated information in its original plaintext form.

The cryptographic infrastructure needed to allow users to easily and transparently secure their communications can be complex. Delegation of cryptographic functionality entails a certain degree of trust of the infrastructure components that provide the functionality. Accordingly, a third-party organization providing the cryptographic functionality may be able to exploit this trust to obtain the original, unencrypted communications. Such a risk may not be acceptable to some users, e.g., when conducting highly sensitive communications.

SUMMARY

In one embodiment, a computer-implemented method performed by a client device of a user comprises obtaining, from a communication server, conversation key data for participating in a secure conversation between a plurality of users; deriving a conversation key from the conversation key data; encrypting a message using the conversation key; and sending the encrypted message to the communication server for delivery to other users of the plurality of users; wherein the communication server cannot decrypt the encrypted message.

In one embodiment, a computer-implemented method performed by a communication server comprises storing a wrapped version of a conversation key generated at an organization system, the wrapped version being generated by encrypting the conversation key using a user account key; receiving a message from a first client device, the message encrypted using the conversation key and being undecipherable by the communication server; sending the message for delivery to a second client device; receiving a request from the second client for the conversation key and for the user account key; and sending the wrapped version of the conversation key for delivery to the second client device, and the request for the user account key for delivery to the organization system.

In one embodiment, a communication server comprises a computer processor and a computer-readable storage medium. The a computer-readable storage medium stores instructions comprising instructions for storing a wrapped version of a conversation key generated at an organization system, the wrapped version being generated by encrypting the conversation key using a user account key; instructions for receiving a message from a first client device, the message encrypted using the conversation key and being undecipherable by the communication server; instructions for sending the message for delivery to a second client device; instructions for receiving a request from the second client for the conversation key and for the user account key; and instructions for sending the wrapped version of the conversation key for delivery to the second client device, and the request for the user account key for delivery to the organization system.

The features and advantages described in the specification are not all inclusive and, in particular, many additional features and advantages will be apparent to one of ordinary skill in the art in view of the drawings, specification, and claims. Moreover, it should be noted that the language used in the specification has been principally selected for readability and instructional purposes, and may not have been selected to delineate or circumscribe the inventive subject matter.

The figures depict various embodiments of the present invention for purposes of illustration only. One skilled in the art will readily recognize from the following description that other alternative embodiments of the structures and methods illustrated herein may be employed without departing from the principles of the invention described herein.

DETAILED DESCRIPTION

Figure 1:
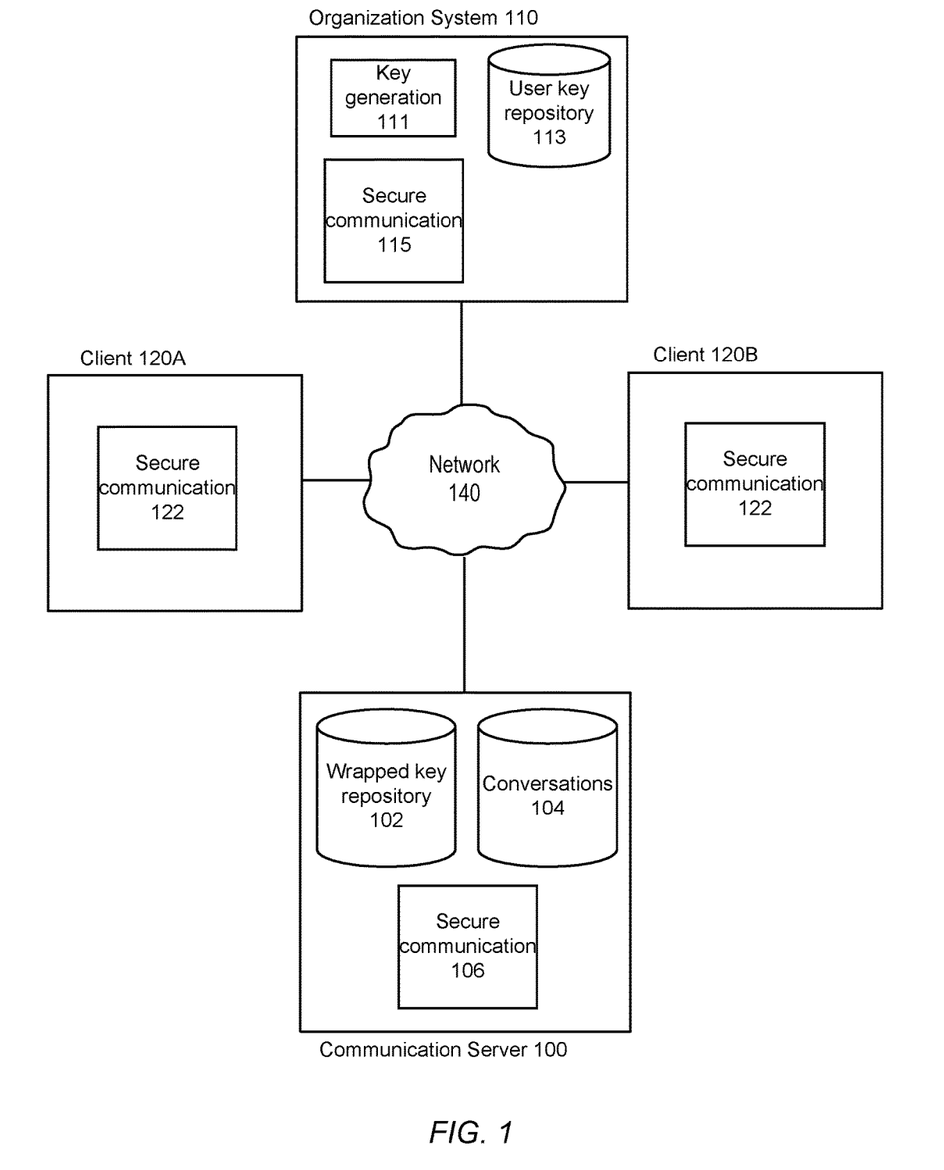
FIG. 1 shows a system environment in which secure communications takes place, according to one embodiment.

FIG. 1 shows a system environment in which secure communications takes place, according to one embodiment. Users of an organization that wishes its messages to be secure (the "communicating organization") send secure messages between their various client devices 120. To achieve the desired security, the client devices 120 use services of a secure communications infrastructure. The secure communications infrastructure is implemented by the interactions of several different components, including an organization system 110 under the control of the communicating organization, and a communication server 100 under the control of a security organization, as well as secure communication modules 122 installed on the client devices 120.

The organization system 110 is administered by the communicating organization, such as a business, educational institution, or governmental entity. The organization system 110 includes a key generation module 111 that generates cryptographic keys for use by its users when they securely communicate. The generated keys are stored (in encrypted form) in a user key repository 113. In one embodiment, the keys include an account key for each user, and a conversation key for each conversation in which the user can participate. As explained in more detail below, a "conversation" has a corresponding set of users that may participate in it and includes the messages exchanged between the participant users as part of that conversation. The organization system 110 also includes a secure communication module 115 that implements security protocols for interacting with the client devices 120 and communication server 100 to provide clients with secure communication capability.

The key generation module 111 and the key repository 113, as well as the secure communication module 115, may be implemented in different ways in different embodiments. For example, in one embodiment the key generation module 111, the key repository 113, and the secure communication module 115 are all implemented in hardware by a hardware security module (HSM) located on the premises of the communicating organization, which increases security of the keys. In other embodiments, the key generation module 111 and the secure communication module 115 are implemented in software, and the key repository 113 is stored in standard storage media, without any special hardware protection layer. Although the various components of the organization system are illustrated in FIG. 1 as being part of the organization system 110, in some embodiments they may be physically present in "the cloud" and accessed by the organization system 110 via the network 140.

In some embodiments, the key generation module 111 regenerates the cryptographic keys at different times, e.g., at a fixed time interval. In such embodiments, the user key repository 113 stores, for each user and each key for that user, a set of entries. Each entry includes the key itself and the time period during which the key is valid. For example, in cases where the conversation keys for users is rotated daily, the entries for user's conversation key include the conversation key and an indication of the day for which the key is valid. Then, when a user sends a new message as part of a conversation, the user's current conversation key is used; to decrypt an old message, the conversation key corresponding to the sending time of the old message is obtained and used to decrypt the old message.

In some embodiments, keys are generated from other keys, such as the conversation keys for a particular organization system 110 being derived in part based on the account key for that organization system. In some embodiments, older keys are deleted from the key repository 113 after the expiration of some key retention period (e.g., three months), and the data with which the deleted keys were encrypted may optionally also be deleted. Whether or not the encrypted data is deleted, as long as the encryption keys themselves (and any keys from which they were generated) have been deleted, the encrypted data cannot be decrypted.

The communication server 100 facilitates secure communications between the client devices 120 of users who are members of the communicating organization. For example, in embodiments in which the users communicate with each other via multi-user conversations, the communication server 100 includes a conversations repository 104 that stores metadata defining the conversations, as well as the (encrypted) messages that have been exchanged as part of the conversation. As previously noted, a conversation has a corresponding set of users that may participate in it and includes the messages exchanged between the participant users as part of that conversation. Thus, in one embodiment each conversation in the conversations repository 104 has corresponding metadata including a name of the conversation (e.g., "Project X negotiations", or "Sales team—Europe") and identifiers of a set of users of the organization system 110 that are permitted to participate in the conversation. The conversations repository 104 further stores the messages that have previously been exchanged between the various participants in a conversation. (As described below, the messages are exchanged in encrypted form, and thus the messages stored in the conversations repository 104 are likewise encrypted and hence not readable by the communication server 100 itself.) In one embodiment, for enhanced security an administrator of the organization system 110, or another user with similarly high access privileges, establishes the conversations, adding to the conversation those users that should be eligible participants in, and audience for, the conversation.

The communications server 100 includes a secure communications module 106 that facilitates communications between the various client devices 120. For example, and as illustrated below in more detail with respect to FIG. 2, the secure communications module 106 authenticates users of the organization system 110 and subsequently vouches for their identities, stores and provides encrypted keys, and performs other operations allowing users' client devices 120 to obtain appropriate cryptographic keys. As another example, illustrated below in more detail with respect to FIG. 3, the secure communications module 106 also distributes any messages sent by clients as part of conversations.

For instance, assume that a user A is using the client device 120A to send messages for the "Project X negotiations" conversation, and the "Project X negotiations" conversation is defined as having participant users A, B, and C. The secure communications module 106 may receive a (encrypted) message from user A as part of that conversation, and accordingly distribute the same messages to users B and C (the other participants in the conversation), as well as saving a copy of the message in the conversations repository 104 in association with the "Project X negotiations" conversation.

The communication server 100 additionally includes a wrapped key repository 102 populated with user cryptographic keys as a result of operations such as those illustrated in FIG. 2, below. The conversation keys of the users are "wrapped"—that is, stored in encrypted form—using keys not available to the communication server 100. (In some embodiments, other cryptographic keys of the users may be wrapped as well.)

The client devices 120 of the users are computing devices with sufficient ability to communicate over the network 140, e.g., with the communication server 100. Laptop or desktop computers, personal digital assistants, smartphones, tablet computers, and the like are examples of possible client devices 120. The client devices 120 each have a secure communication module 122 that allows the client devices to perform cryptographic operations and communicate with the communication server 100 to securely exchange messages. Actions of the client devices 120 illustrated in FIGS. 2-3, below, are examples of the operation of the secure communication module 122.

The client devices 120, the organization system(s) 110, and the communication server 100 communicate with each other through a network 140. The network may be any suitable communications network for data transmission. In one embodiment, the network 140 is the Internet and uses standard communications technologies and/or protocols.

In one embodiment, the security organization administering the communication server 100 also provides the organization system 110 with the software that implements the key generation module 111 and the secure communication module 115, and provides the client devices 120 with the software that implements the secure communication modules 122. The secure communication infrastructure are implemented through the interactions of all these components.

It should be understood that although for simplicity FIG. 1 depicts only one organization system 110 and two client devices 120 for the communication server 100, there could be any number of each. For example, the communication server 100 could serve any number of organization systems 110, and each organization system 110 could have any number of users and client devices 120. There may likewise be multiple communication servers 100.

Note that since the cryptographic keys (at least conversation keys) of users are wrapped before being stored in the wrapped key repository 102 on the communication server 100, even though the communication server 100 stores the user keys, the communication server cannot access the actual unencrypted values of the keys. Hence, the communication server 100, even though acting as the facilitator of encrypted communications, need not be trusted by the users. For example, since the communication server 100 lacks access to the original unencrypted values of user cryptographic keys such as the conversation keys, the communication server cannot use the keys to obtain access to messages of the users that were encrypted using those conversation keys; that is, the user messages are undecipherable with respect to the communications server. Accordingly, there is no danger that employees of the communication server will abuse their privileged position to learn user secrets, or that the communication server itself could systematically read user conversations.

Example Interaction Sequence for Key Exchange and Secure Messaging

Figure 2:
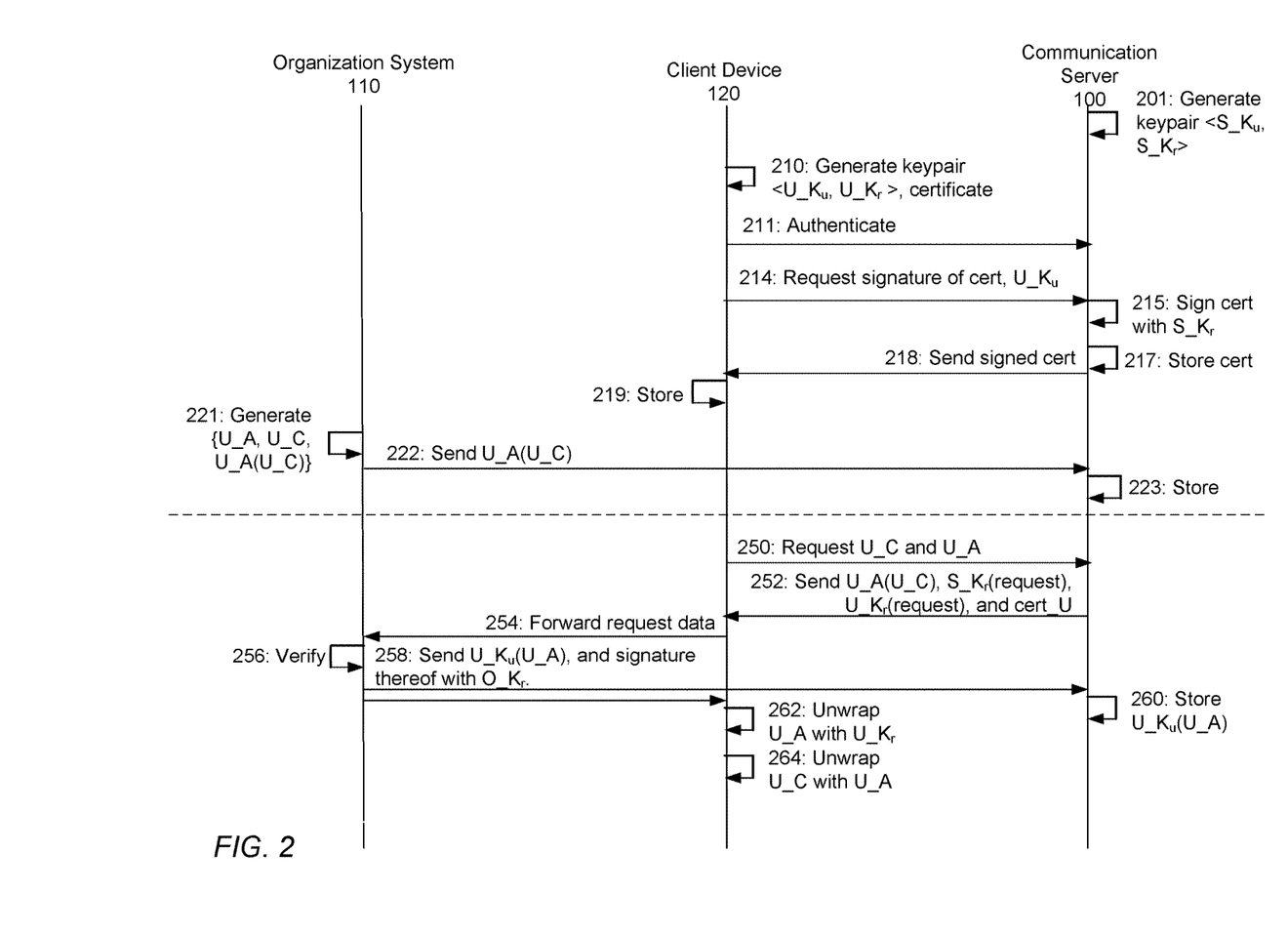
FIG. 2 is a sequence diagram illustrating interactions between the different entities of FIG. 1 as part of generating and exchanging cryptographic keys, according to one embodiment.

FIG. 2 is a sequence diagram illustrating interactions between the different entities of FIG. 1 as part of generating and exchanging cryptographic keys, according to one embodiment. FIG. 2 illustrates several distinct phases involved in a client device 120 ultimately obtaining a conversation key that will permit it to participate in a secure conversation with other client devices. In a preliminary phase including steps 210-219, a new user is registered, permitting the user to gain access to secure communications of the communicating organization. In a phase including steps 221-223, the organization system 110 generates the cryptographic keys for the new user. And in a phase including steps 250-264, the client device 120 of the user requests a conversation key so that it can communicate as part of a conversation with a particular set of other users included in the conversation.

Initially, the communication server 100 generates 201 a keypair consisting of a public key and private key, hereinafter referred to as $S\_K_u$ (server's public key) and $S\_K_r$ (server's private key, corresponding to the public key). The generation of $S\_K_u$ and $S\_K_r$ may be accomplished using algorithms such as RSA (Rivest-Shamir-Adleman), and need not occur frequently, e.g., only once.

In steps 210-219, a new user, using a client device 120, registers to use the organization system (or is registered by an administrator, for example). The new user's client device 120 generates 210 a keypair $U\_K_u$ (the new user's public key) and $S\_K_r$ (the new user's private key, corresponding to the public key) and a digital certificate for the new user that includes the public key $U\_K_u$.

In order to gain full access to communications, the new user establishes himself/herself with the communication server 100. Accordingly, the user's client device 120 (typically with input specified by the new user) authenticates 211 with the communication server 100, such as by providing a password or shared secret, or by using single sign-on (SSO). Assuming that the client device 120 successfully authenticates itself with the communication server 100 at step 211, the client device 120 then requests 214 that the communication server 100 sign the digital certificate that includes $U\_K_u$. The communication server 100 then signs 215 the digital certificate as requested, e.g., by applying a hash function to the digital certificate and applying its private key $S\_K_r$ to the resulting hash value. The signature serves as an indication that the communication server 100 vouches for the correctness of the digital certificate, including the binding of the new user to the new user's public key $U\_K_u$. The communication server 100 then stores 217 the signed digital certificate within its key repository 102 and sends 218 the signed certificate back to the client device 120, which likewise stores 219 the certificate in its local storage.

In steps 221-223, the organization system 110 of the communicating organization ensures that each of the users of the communicating organization has appropriate cryptographic keys for communication. Specifically, the organization system 110 generates 221, for each of the users of the communicating organization that has registered, or been registered by an administrator with the communication server 100—including, for example, the new user of steps 210-219—a user account key U_A, storing it in the user key repository 113. For each of the users, and for each of the established conversations of which the user is a member, the organization system 110 also generates 221 a conversation key U_C to use for cryptographic operations for that conversation. In one embodiment, the account key U_A and the conversation keys U_C for a user are re-generated at some preset time interval (e.g., daily), leading to a rotated set of account keys and conversation keys for that user, each key corresponding to a particular time period. Key rotation enhances security by ensuring that if the key is somehow obtained by an unauthorized party, it will only be usable for the particular time period to which it corresponds (e.g., a particular day). For each of the established conversations of which a user is a member, the organization system 110 encrypts the corresponding conversation key U_C with the user's account key U_A, thereby generating U_A(U_C)— that is, the key U_C, as encrypted using the key U_A. (The notation k(data) is employed herein as shorthand for f(k, data), where f( ) is a cryptographic transformation, such as encryption or decryption using symmetric-key algorithms such as AES256 (Advanced Encryption Standard, 256-bit), or signature/verification using asymmetric-key algorithms such as RSA, that transform the value data using the key k.) The organization system 110 sends 222 this encrypted conversation key for delivery to the communication server 100, which stores 223 the encrypted key in the user key repository 113 in association with the user and conversation. Note that since the key U_C, as well as U_A, is stored only on the organization system 110, with the communication server 100 storing only the encrypted key U_A(U_C), the communication server 100 does not have direct access to U_C (or U_A), and hence cannot use U_C to read the content of the user's encrypted conversations.

In steps 250-264, the user of a client device 120 obtains the user's current conversation key U_C for a particular conversation so that the user can participate in that conversation. (The user may need to obtain U_C, and U_A, after they have first been generated or rotated by the organization system 110, for example; thereafter, the user's client device 120 can cache U_C and U_A while they remain valid, assuming that the client device 120 can retain state.) To this end, the user's client device 120 requests 250 the user's conversation key U_C by sending a message embodying the request ("mReq_U_C") to the communication server 100, along with U_K$_r$(mReq_U_C)—the request as signed by the user—which verifies that the user is the source of the request. Further assuming that the user's client device 120 has not yet obtained U_A, the user's client device 120 additionally requests 250 the user's account key U_A by sending a message embodying the request ("mReq_U_A") to the communication server 100, along with U_K$_r$(mReq_U_A)—the request as signed by the user.

The communication server 100, which previously stored the encrypted conversation key, U_A(U_C), verifies the request mReq_U_C as coming from the user by verifying the signature U_K$_r$(mReq_U_C) using the user's public key, U_K$_u$, which it had stored at step 217 as part of the digital certificate. Assuming that verification is successful, the communication server 100 sends 252 the value U_A(U_C) for delivery to the client device 120.

However, given the assumption that the client device 120 has not yet obtained U_A, the client device cannot obtain U_C from the value U_A(U_C). Accordingly, in response to mReq_U_A, the communication server 100 also sends 252, for delivery to the client device 120, the values S_K$_r$(mReq_U_A) and U_K$_r$(mReq_U_A)—the request for U_A as signed by the communication server 100 and by the user, respectively. The communication server 100 also sends cert_U, the certificate of the user that it signed at step 215 and stored at step 217. The client device 120 then forwards 254 these data to the organization system 110.

Upon receipt of the data from step 254, the organization system 110 verifies 256 that the requests are indeed from the communication server 100 by applying the well-known public key of the communication server, S_K$_u$, to the received signature S_K$_r$(mReq_U_A) and ensuring that the result matches the received request mReq_U_A. Similarly, the organization system 110 verifies 256 that the requests originated from the user by applying the public key of the user, U_K$_u$, to the received signature U_K$_r$(mReq_U_A) and ensuring that the result matches the received request mReq_U_A. (If the organization system 110 does not already have U_K$_u$, U_K$_u$ may in turn be obtained from the certificate cert_U, after the organization system 110 verifies cert_U by verifying the signature of the communication server 100 on cert_U.)

If the verification of step 256 is successful, the organization system 110 has established that the request for U_A did indeed originate with the user. Accordingly, the organization system 110 obtains the account key U_A for the user from the user key repository 113, encrypting it so that only the user can obtain it by applying the user's public key to produce U_K$_u$(U_A). The organization system 110 also signs the encrypted key with its own private key, O_K$_r$, producing the value O_K$_r$(U_K$_u$(U_A)). (For simplicity of explanation, it is assumed that the communications server 100 has previously obtained the public key O_K$_u$, corresponding to the private key O_K$_r$.) The organization system 110 sends 258 the values U_K$_u$(U_A)) and O_K$_r$(U_K$_u$(U_A)) to the communication server 100, and also (either directly, or via the communication server 100) to the client device 120.

The communication server 100 verifies that the value U_K$_u$(U_A) came from the organization system 110 by applying O_K$_u$ to the signed O_K$_r$(U_K$_u$(U_A)), storing 260 the value U_K$_u$(U_A) if verification is successful. With U_K$_u$(U_A) stored, the communication server 100 can in the future provide it directly, omitting steps 252-258, should a client device 120 again request U_A during the time period in which U_A is still valid, such as when obtaining conversation keys U_C for other conversations.

After obtaining U_K$_u$(U_A) from the organization system, the client device 120 unwraps 262 U_A by applying its own private key, U_K$_r$, to U_K$_u$(U_A), and then unwraps 262 U_C by decrypting U_A(U_C), which it received at step 252, with U_A.

At this point, the client device 120 has the user's conversation key, U_C, for the desired conversation. The user can accordingly send and receive messages in the conversation, and the client device 120 can encrypt and decrypt the messages using U_C, as is now illustrated in FIG. 3.

It is understood that although FIG. 2 illustrates the operations occurring in a particular order, other variations are possible. For example, certain operations are performed in FIG. 2 so as to avoid the communication server 100 directly communicating with the organization system 110, since many administrators of such systems 110 prefer to avoid direct server-to-server connections. For organization systems 110 not prohibiting server-to-server communications, certain of the communications illustrated in FIG. 2 could be delivered directly by the communication server 100 to the organization system 110 without using the client device 120 as an intermediary, for example.

Figure 3:
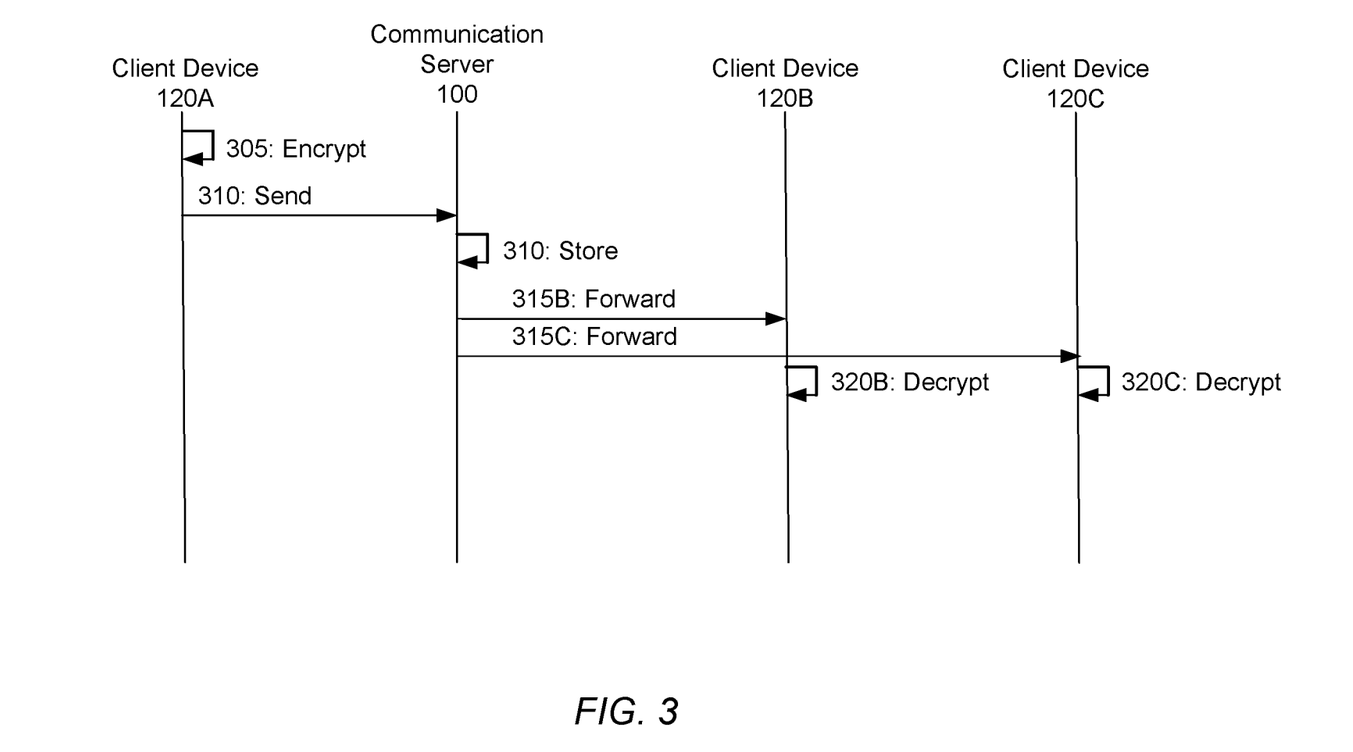
FIG. 3 illustrates interactions of the communication server and client devices of FIG. 1 when exchanging a message as part of a conversation, according to one embodiment.

FIG. 3 illustrates interactions of the communication server 100 and client devices 120 when exchanging a message as part of a conversation, according to one embodiment.

In the example scenario illustrated in FIG. 3, the devices 120A-C belong to three corresponding users (A, B, and C) who are registered with the organization system 110, and there is a conversation "Project X negotiations" defined in the conversations repository 104 for which users A, B, and C are the listed participants. Further assume that the client devices 120 have previously obtained the conversation keys for their respective users, e.g., as a result of the operations illustrated in FIG. 2.

When user A has composed a message to communicate as part of the conversation "Project X negotiations" and has specified that it should be sent, the client device 120A (via its secure communication module 122) encrypts 305 the message using the conversation key U_C previously obtained for that conversation. The client device 120A then sends 310 the encrypted message to the communication server 100.

The communication server 100 stores 310 the encrypted message as part of the messages for the conversation in the conversations repository 104. Since the message is encrypted with U_C, the original value of which can be accessed only by the organization system 110 and (as a result of the operations of FIG. 2) by the client 120A, the communication server 100 does not have access to the original plaintext of the message. The communication server 100 identifies the participant users in the conversation by consulting the metadata in the conversations repository 104, determines that user B and user C are also participants in the conversation, and accordingly forwards 315 the encrypted message to client devices 120B and 120C. Upon receipt of the encrypted message, the client devices 120B and 120C decrypt 320 the message using their own conversation keys U_C, which they likewise obtained through operations like those in FIG. 2, and further display the decrypted messages. Users B and C can then respond with their own messages in a similar fashion to those in steps 305-320.

Example Flows for Decrypting Messages

Figure 4A:
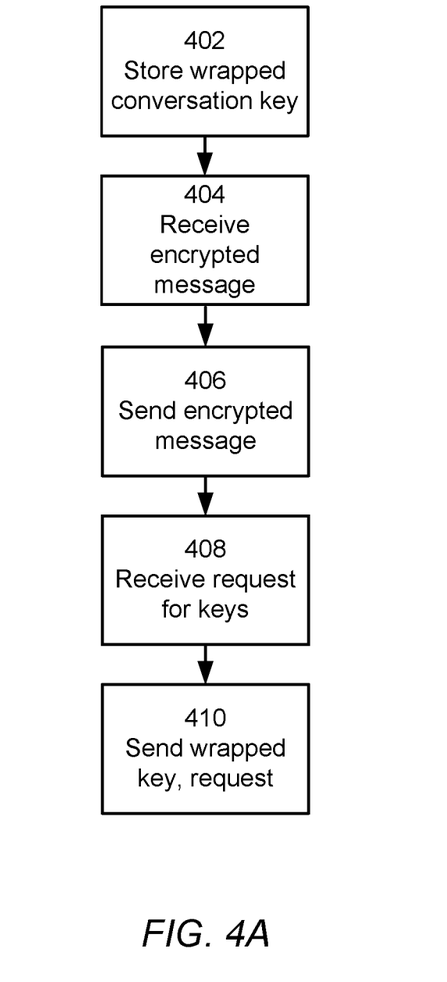
FIG. 4A is a flowchart illustrating steps performed by the communication server of FIG. 1 as part of the exchanging of messages and of data that allow the clients devices to decrypt the messages, according to one embodiment.

FIG. 4A is a flowchart illustrating steps performed by the communication server 100 of FIG. 1 as part of the exchanging of messages and of data that allow the client devices 120 to decrypt the messages, according to one embodiment.

The communication server 100 stores 402 a wrapped version of a conversation key, as described with respect to step 223 of FIG. 2. The wrapped version of the conversation key was generated at an organization system by encrypting the conversation key using an account key. The communication server 100 does not have the account key in unencrypted form, and hence cannot obtain the unwrapped conversation key.

The communication server 100 receives 404 an encrypted message from a first client device as part of a conversation, e.g., as described with respect to step 310 of FIG. 3, where the communication server receives an encrypted message from the client device 120A. The message was encrypted by the first client device using the conversation key and is undecipherable to the communication server 100. The communication server 100 then sends 406 the encrypted message for delivery to a second client device, e.g., as described with respect to step 315B of FIG. 3, where the communication server forwards the encrypted message to the client device 120B.

When the second client device 120 decrypts the message, if it does not already have the conversation key for the conversation of which the encrypted message is a part, the communication server 100 receives 408 a request for cryptographic keys (i.e., the conversation key, and an account key used to encrypt the conversation key into the wrapped version) from the second client device 120 over the network 140, e.g., as described with respect to step 250 of FIG. 2. Accordingly, the communication server 100 sends 410 the wrapped version of the conversation key for delivery to the second client device, and sends the request for the account key for delivery to the organization system, e.g., as described with respect to step 252 of FIG. 2.

If the organization system 110 verifies the request, it will send the account key (in encrypted form decryptable by the user corresponding to the account key) to the second client device. Using the account key, the second client device can obtain the conversation key, and use the conversation key to decrypt the message and display it in unencrypted form to the user of the second client device.

Figure 4B:
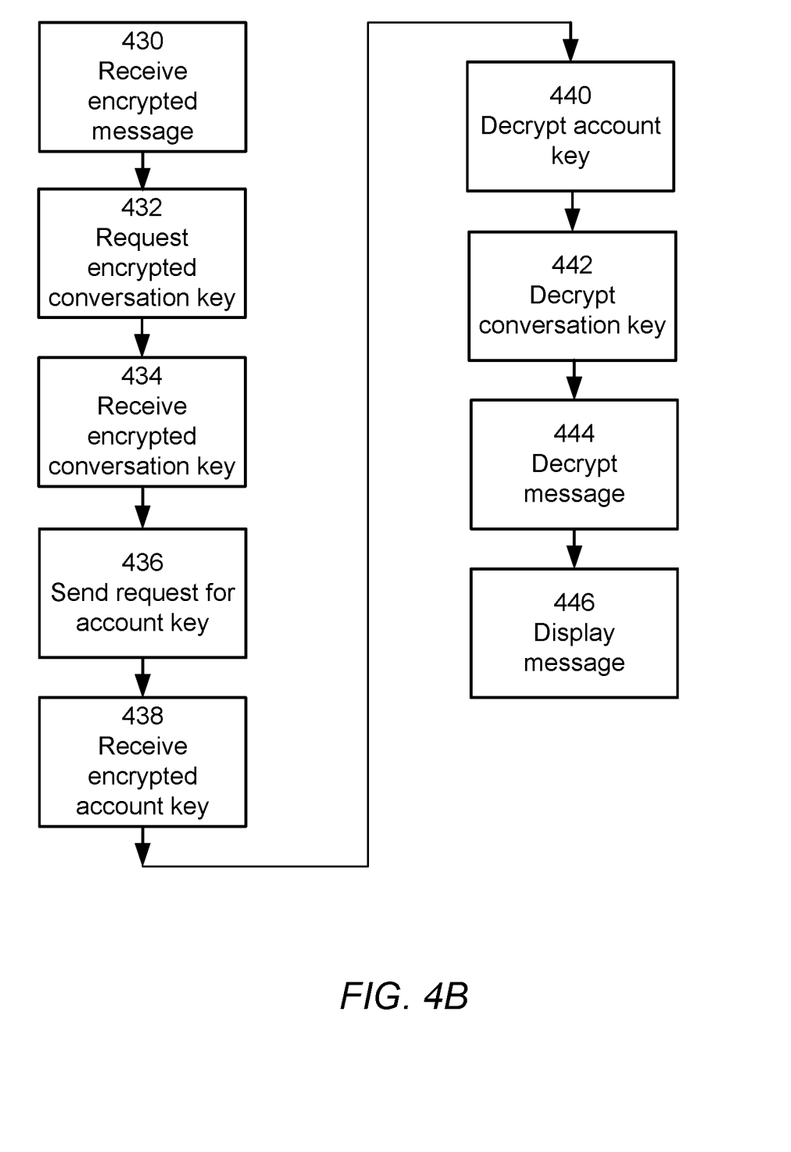
FIG. 4B is a flowchart illustrating steps performed by a client device of FIG. 1, such as the client device of FIG. 3, as part of decryption of a message, according to one embodiment.

FIG. 4B is a flowchart illustrating steps performed by a client device 120 of FIG. 1, such as the client device 120B of FIG. 3 or the second client device mentioned with respect to FIG. 4A, as part of decryption of a message, according to one embodiment.

The client device 120 receives 430 an encrypted message from another client device 120, e.g., as described with respect to step 315B of FIG. 3. The message is encrypted with a conversation key, and hence the recipient client device needs the conversation key to decrypt the message.

The client device 120 requests 432 the conversation key from a communication server 100 and receives the conversation key in encrypted form, e.g., U_A(U_C), as described with respect to steps 250 of FIG. 2.

Assuming that the client device 120 does not yet have the account key of its user, U_A, it cannot obtain U_C in plaintext form. Accordingly, the client device sends 436 a request for the account key U_A, e.g., as described with respect to step 252 of FIG. 2, and the request is ultimately delivered to an organization system 110, which verifies the request.

Assuming that the organization system 110 successfully verified the request for U_A, the organization system sends U_A to the client device 120, encrypted with the public key $U\_K_u$ of the user of the client device 120. The client device 120 receives 438 the encrypted account key U_A, and decrypts 440 U_A, e.g., as described with respect to step 262 of FIG. 2. Likewise, the client device 120 decrypts 442 the conversation key U_C, e.g., as described with respect to step 264 of FIG. 2.

The client device 120 then decrypts 444 the message using the conversation key 444. The client device 120 can then display 446 the message to the user in a user interface.

The steps of FIGS. 4A and 4B may be performed in a different order than those depicted, as well. For example, the communication server 100 may perform steps 408 and 410 of FIG. 4A before the encrypted message is received at step 404. As another example, the client device 120 may perform steps 432-444 of FIG. 4B before step 430.

Example Computer Architecture

Figure 5:
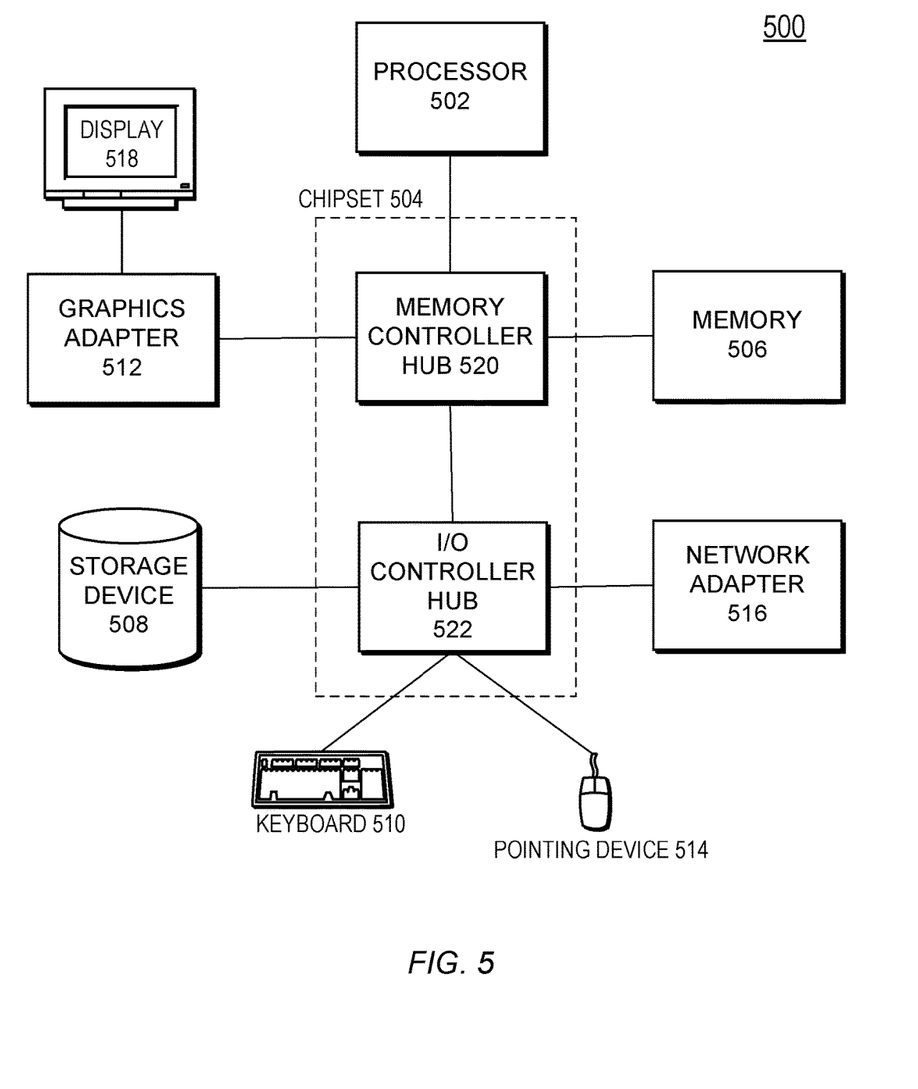
FIG. 5 is a high-level block diagram illustrating physical components of a computer used as part or all of the communication server, organization system, or client device from FIG. 1, according to one embodiment.

FIG. 5 is a high-level block diagram illustrating physical components of a computer 500 used as part or all of the server 100, system 110, or client device 120 from FIG. 1, according to one embodiment. Illustrated are at least one processor 502 coupled to a chipset 504. Also coupled to the chipset 504 are a memory 506, a storage device 508, a keyboard 510, a graphics adapter 512, a pointing device 514, and a network adapter 516. A display 518 is coupled to the graphics adapter 512. In one embodiment, the functionality of the chipset 504 is provided by a memory controller hub 520 and an I/O controller hub 522. In another embodiment, the memory 506 is coupled directly to the processor 502 instead of the chipset 504.

The storage device 508 is any non-transitory computer-readable storage medium, such as a hard drive, compact disk read-only memory (CD-ROM), DVD, or a solid-state memory device. The memory 506 holds instructions and data used by the processor 502. The pointing device 514 may be a mouse, track ball, or other type of pointing device, and is used in combination with the keyboard 510 to input data into the computer 500. The graphics adapter 512 displays images and other information on the display 518. The network adapter 516 couples the computer 500 to a local or wide area network.

As is known in the art, a computer 500 can have different and/or other components than those shown in FIG. 5. In addition, the computer 500 can lack certain illustrated components. In one embodiment, a computer 500 acting as a server may lack a keyboard 510, pointing device 514, graphics adapter 512, and/or display 518. Moreover, the storage device 508 can be local and/or remote from the computer 500 (such as embodied within a storage area network (SAN)).

As is known in the art, the computer 500 is adapted to execute computer program modules for providing functionality described herein. As used herein, the term "module" refers to computer program logic utilized to provide the specified functionality. Thus, a module can be implemented in hardware, firmware, and/or software. In one embodiment, program modules are stored on the storage device 508, loaded into the memory 506, and executed by the processor 502.

Other Considerations

Reference in the specification to "one embodiment" or to "an embodiment" means that a particular feature, structure, or characteristic described in connection with the embodiments is included in at least one embodiment. The appearances of the phrase "in one embodiment" in various places in the specification are not necessarily all referring to the same embodiment.

It should be noted that the process steps and instructions are embodied in software, firmware or hardware, and when embodied in software, can be downloaded to reside on and be operated from different platforms used by a variety of operating systems.

The operations herein may also be performed by an apparatus. Furthermore, the computers referred to in the specification may include a single processor or may be architectures employing multiple processor designs for increased computing capability. It will be appreciated that a variety of programming languages may be used to implement the teachings of the present invention as described herein, and any references below to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A computer-implemented method performed by a client device of a user, comprising:
    obtaining, from a communication server, conversation key data for participating in a single, secure conversation between a plurality of users;
    deriving a conversation key from the conversation key data, the conversation key generated by an organization system remote from the communication server and administered by an organization different from an organization that administers the communication server,
        wherein the conversation key comprises a cryptographic key that permits the plurality of users to participate in the single, secure conversation from a plurality of conversations established by the organization system;
    encrypting a message of the user using the conversation key; and
    sending the encrypted message to the communication server for delivery to other users of the plurality of users,
        wherein the communication server cannot decrypt the encrypted message.

2. The computer-implemented method of claim 1, wherein the conversation key data comprises the conversation key encrypted using a user account key of the user.

3. The computer-implemented method of claim 2, further comprising sending a request to the organization system for the user account key as signed by a private key of the communication server and as signed by a private key of a user of the user account key.

4. The computer-implemented method of claim 3, further comprising:
    receiving an encrypted form of the user account key;
    decrypting the encrypted form of the user account key to obtain the user account key; and
    deriving the conversation key from the conversation key data using the user account key.

5. The computer-implemented method of claim 2, wherein the communication server does not have access to the user account key in unencrypted form.

6. The computer-implemented method of claim 1, wherein the communication server does not have access to an unencrypted form of the conversation key.

7. The computer-implemented method of claim 1, wherein each user from the plurality of users is associated with a respective user account key.

8. A computer-implemented method performed by a communication server, the computer-implemented method comprising:
    storing a wrapped version of a conversation key generated at an organization system, the wrapped version being generated by encrypting the conversation key using a user account key generated by the organization system, the organization system being remote from the communication server and administered by an organization different from an organization that administers the communication server,
        wherein the conversation key comprises a cryptographic key that permits a set of client devices to participate in a single conversation from a plurality of conversations established by the organization system;
    receiving a message from a first client device in the set of client devices, the message encrypted using the conversation key and being undecipherable by the communication server;
    sending the message for delivery to a second client device in the set of client devices;
    receiving a request from the second client device for the conversation key and for the user account key; and
    sending the wrapped version of the conversation key for delivery to the second client device;
    sending the request for the user account key for delivery to the organization system,
        wherein the organization system sends a wrapped version of the user account key to the second client device in response to receiving the request for the user account key, and
        wherein the second client device unwraps the wrapped version of the user account key and unwraps the wrapped version of the conversation key using the user account key.

9. The computer-implemented method of claim 8, wherein sending the request for the user account key comprises sending a request for the user account key as signed by a private key of the communication server and as signed by a private key of a user of the user account key.

10. The computer-implemented method of claim 8, wherein the communication server does not have access to an unencrypted form of the conversation key.

11. The computer-implemented method of claim 8, wherein the wrapped version of the user account key is wrapped with a public key of the user, wherein the second client device unwraps the wrapped version of the user account key using a private key of the user.

12. The computer-implemented method of claim 8, wherein each user of a client device from the set of client devices is associated with a respective user account key.

13. The computer-implemented method of claim 8, wherein the communication server does not have access to the user account key in unencrypted form.

14. A communication server comprising:
a physical computer processor; and
a non-transitory computer-readable storage medium storing instructions that when executed by the physical computer processor perform actions comprising:
storing a wrapped version of a conversation key generated at an organization system, the wrapped version being generated by encrypting the conversation key using a user account key generated by the organization system, the organization system being remote from the communication server and administered by an organization different from an organization that administers the communication server, wherein the conversation key comprises a cryptographic key that permits a set of client devices to participate in a single conversation from a plurality of conversations established by the organization system;
receiving a message from a first client device in the set of client devices, the message encrypted using the conversation key and being undecipherable by the communication server;
sending the message for delivery to a second client device in the set of client devices;
receiving a request from the second client device for the conversation key and for the user account key; and
sending (i) the wrapped version of the conversation key for delivery to the second client device, and (ii) the request for the user account key for delivery to the organization system.

15. The communication server of claim 14, wherein sending the request for the user account key comprises sending a request for the user account key as signed by a private key of the communication server and as signed by a private key of a user of the user account key.

16. The communication server of claim 14, wherein the communication server does not have access to an unencrypted form of the conversation key.

17. The communication server of claim 14, wherein the wrapped version of the user account key is wrapped with a public key of the user, and wherein the second client device unwraps the wrapped version of the user account key using a private key of the user.

18. The communication server of claim 14, wherein each user of a client device from the set of client devices is associated with a respective user account key.

19. The communication server of claim 14, wherein the communication server does not have access to the user account key in unencrypted form.

* * * * *